United States Patent
Bredin

Patent Number: 5,189,451
Date of Patent: Feb. 23, 1993

[54] PLATTER FEED SAFETY

[76] Inventor: Robert C. Bredin, 1267 Anderson Ave., Apt. 13, Fort Lee, N.J. 07024

[21] Appl. No.: 817,783

[22] Filed: Jan. 8, 1992

[51] Int. Cl.⁵ .............................................. G03B 21/00
[52] U.S. Cl. ..................................... 352/128; 352/14; 242/55.19 R; 226/44
[58] Field of Search .................. 352/14, 126, 128; 242/55.19; 226/44

[56] References Cited

U.S. PATENT DOCUMENTS

| | | | |
|---|---|---|---|
| 2,875,667 | 3/1959 | Chedister | 242/55.19 R |
| 3,154,011 | 10/1964 | Gottscho et al. | 226/44 |
| 3,384,281 | 5/1968 | Mason | 226/44 |
| 3,587,959 | 6/1971 | Glover | 226/44 |
| 3,823,890 | 7/1974 | Potts | 352/128 |
| 4,708,447 | 11/1987 | Kuoni | 242/55.19 R |

Primary Examiner—Monroe H. Hayes
Attorney, Agent, or Firm—Notaro & Michalos

[57] ABSTRACT

A safety device for the feed out path of film from a platter system includes a plate pivotally or slidably mounted to a support of the platter system, and carrying a roller which is engaged by film on the feed out path. A spring biases the plate toward an inactive position where the platter system operates normally. If a head wrap condition begins, tension increases on the feed out path which moves the plate against the spring to activate a switch which interrupts power to the platter system and to a projector connected to the platter system.

5 Claims, 5 Drawing Sheets

PLATTER FEED SAFETY

FIELD AND BACKGROUND OF THE INVENTION

The present invention relates in general to platter systems which are used in conjunction with projectors in movie theaters for showing movies, and in particular, to a new and useful safety apparatus for avoiding a condition known as head wrap, where the film is inadvertently wrapped a multiplicity of times around a stationary central area of the platter system when the platter rotates too quickly, to slowly or fails to rotate at all.

Full length movies are currently supplied to movie houses on multiple reels which each carry only enough film for approximately ½ hour of showing. In the past a projectionist was required to operate multiple projectors which were mounted with one of the reels to avoid interruption in the movie as the projection function would shift from one projector to another.

More recently, movie houses have adopted the use of a platter system which comprises two or more platters which may each encompass the entire full length feature. The multiple reels are spliced together and then stored in a horizontally extending spool on one of the platters in the platter system. The film is fed from that platter to a projector and then back to a take up platter of the platter system. For the next showing, the take up platter is used as the feed platter with the film being rethreaded through the projector for showing the film in the proper direction.

The projector which functions to bring each frame of the film into the proper position for projecting its image onto a screen, operates at a constant speed.

The platter system which feeds the film to the projector and takes up the film from the projector is controlled independently from the projector and has a variable speed.

The platter operating as the take up platter and under normal conditions rotates at a speed sufficient to take up the film being fed from the projector. The take up platter is operated by a take up speed control which maintains constant tension on a film as it moves along a take up path from the projector. A fail safe switch is known for mounting under the projector. the fail safe switch has a roller which rolls against the taught film moving along the take up path. The roller is connected to a pivotable arm which engages the fail safe switch. When film tension is lost, the arm pivots to activate the switch. Film tension is lost due to a break in the film or at the end of a film. The fail safe switch is connected in such a way to cut power to the projector.

The other platter in the platter system which feeds the film is referred to as the feed out platter. Under normal conditions the feed out platter will supply film at a rate at which it is needed by the projector. The demand is constant but the speed of rotation of the feed out platter is not. The speed of the feed out platter increases and decreases in cycles throughout the entire length of the movie. This is due to the design of the feed out control mechanism and results in very little film tension on the film of the feed out film path to the projector.

Head wrap is a condition which occurs on the feed out platter due to a mismatch in supply and demand between the feed out platter and the projector. It is caused by the feed out platter rotating too fast or too slow or not at all for an extending period of time. Under normal conditions there is no film tension on the feed out path. Under a head wrap condition there will be film tension which increases proportionally to the amount of film that has been wrapped around the fixed central area or head of the platter. Once the head wrap condition has begun it will continue without interruption until a threshold of tension is reached when the film will either break, damage rollers and film guides, sprockets, become jammed in the projector and melt or some combination of the foregoing. A head wrap can be the result of many possible problems including operator error, faulty equipment or damaged film. Normally a head wrap condition is not realized until the movie has been interrupted. It often requires more than an hour's time to correct the damage. This usually results in refunds to the movie patrons and general confusion in the movie theater. Although a safety mechanism in the form of the fail safe in the take up path is known, there is no known safety mechanism for the film in the feed path. This may be due to the more passive role of the feed out platter and its feed out path, which, upon breakage or the end of a film, is perceived to suffer no ill effects.

A need thus remains for a mechanism to avoid head wrap conditions in currently used and available film platter systems.

SUMMARY OF THE INVENTION

An object of the present invention is to provide a film feed safety for platter systems which automatically detects the beginnings of the head wrap condition, and takes appropriate action, and in particular by shutting down the projector and platter system. Although the head wrap condition is not prevented, it is caught earlier to avoid serious damage and long interruption in the showing of the film.

The present invention is an electromechanical film feed out safety mechanism which includes a mechanical roller portion to be mounted on a vertical support of a platter system, and an electronic circuit including a microswitch activated by the roller portion. When increased tension in the feed out path is sensed by movement of the roller portion, the microswitch disconnects power to the projector and platter driving mechanisms to avoid a head wrap condition. Increased tension signifies the beginning of a head wrap condition.

A further object of the present invention is to provide an electromechanical film feed safety mechanism which is easily retrofit to existing platter systems and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
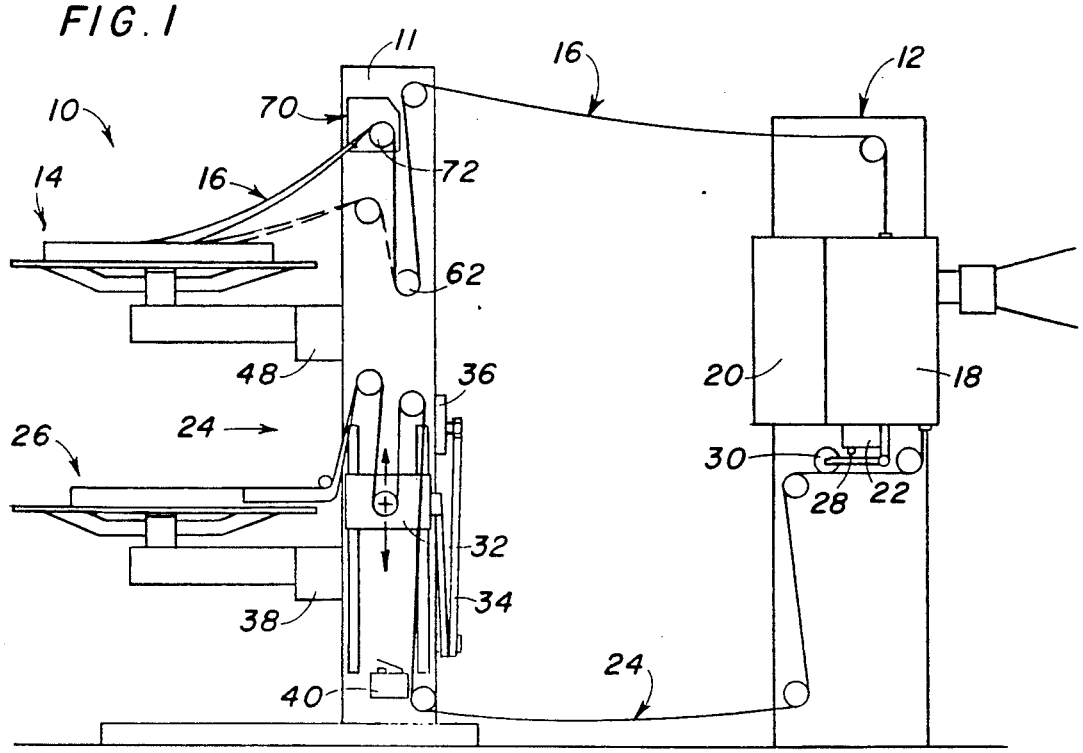
FIG. 1 is a schematic side elevational view of platter system and projector assembly for projecting full length movies in movie theaters.

Referring to the drawings and FIG. 1 in particular, a platter system generally designated 10 carries a plurality, usually three, separate platters which may be used either to feed out or take up film. In FIG. 1, only two platters are shown wherein a feed out platter 14 is mounted on a vertical post or support 11 for the platter system, for feeding film to a feed out path 16 which extends from platter 14 to the projector assembly 12. At projector assembly 12, the film is fed to a projector 18 which, after showing the film in a frame by frame manner with the help of a light source 20, supplies the film to a take up path 24 which extends from the projector 18 to a take up platter 26 in the platter system. A known fail safe mechanism 22 is mounted beneath the projector 18 and has an arm 28 with roller 30 in contact with the film on take up path 24. The arm in its upper position which is maintained with the film at proper tension on the take up path, is held against a microswitch to hold the microswitch closed and maintain power to the projector 18 and the light source 20. If tension is lost on the take up path, for example, at the end of the film or if the film breaks, arm 28 drops, opening the microswitch and interrupting power to the projector and light.

The film take up path at the platter support 11 includes a take up roller plate 32 which is mounted for vertical movement on rails to the support 11. Plate 32 carries a roller which engages a loop of film in the take up path, and is also connected by a lever assembly 34 to a variable transformer 36 which controls the amount of power and thus the speed of a take up motor schematically illustrated at 38 for rotating the rotatable part of the take up platter 26. If the take up platter 26 is rotating too slowly, the loop of film engaged to the roller on plate 32 becomes longer, causing the plate to fall. This rotates the control shaft of the variable transformer 36 to increase the speed of the platter motors which in turn shortens the loop of film engaged to plate 32. In converse fashion, if the loop becomes too short, this indicates that the platter 26 is rotating too quickly and the lever arm assembly 34 causes rotation of the variable transformer 36 to slow the platter speed. A stop switch 40 is provided at the bottom of the linear path for plate 32, for stopping the platter system altogether under a film break condition or when the end of the film has passed causing the plate 32 to drop to the lowest position.

Figure 2:
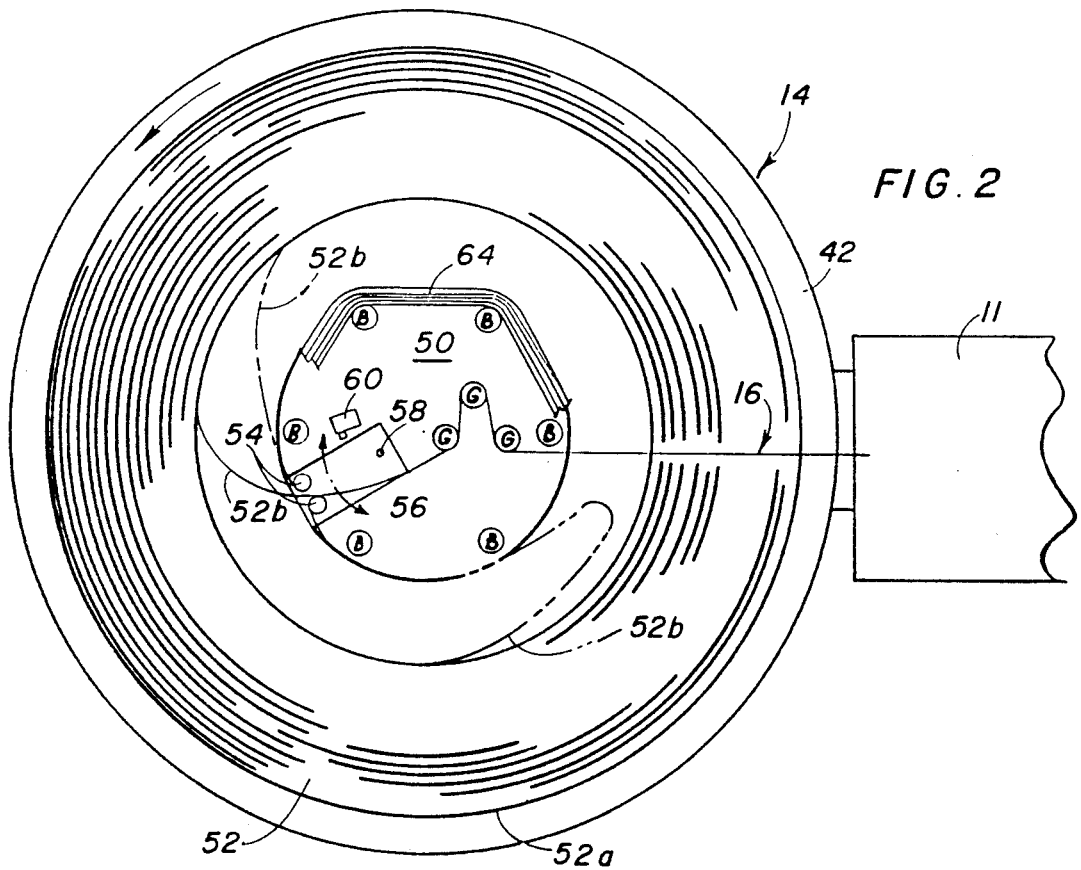
FIG. 2 is a top plan view of a feed out platter used with the present invention.
Figure 3:
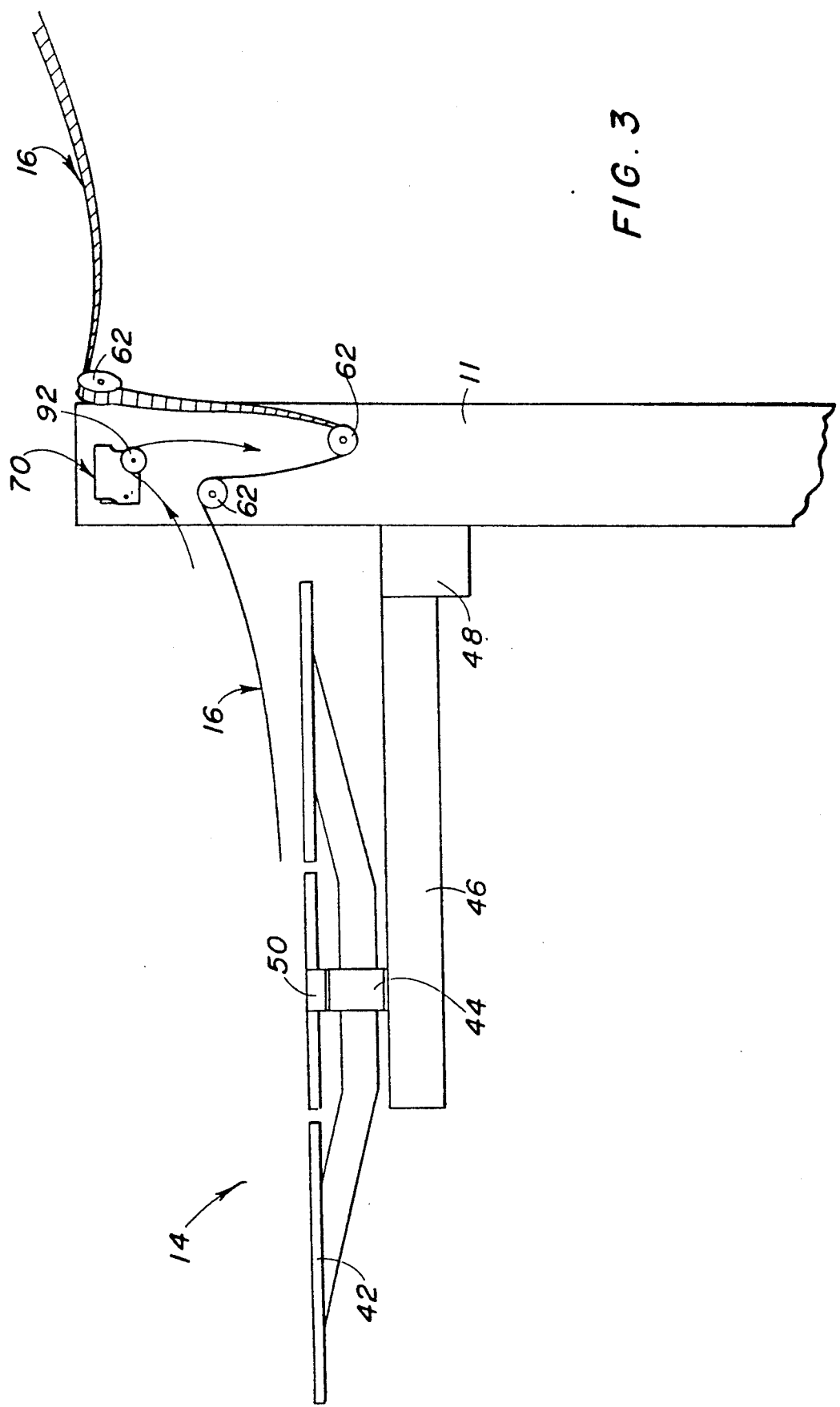
FIG. 3 is a side elevational view of the feed out platter and feed out path used in accordance with the present invention.

FIGS. 2 and 3 are a respective top plan and side view of the feed out platter 14 which comprises an outer ring shaped platform 42 having a hub 44 mounted for rotation on a support arm 46 extending outwardly from platter support 11. A motor schematically shown at 48 is operatively connected to rotatable platform 42 for rotating the platform with respect to a central stationary platform 50 mounted above hub 44.

The rotatable platform 42 carries a coil of film 52 which may contain multiple reels of film representing an entire feature length movie. The end of the film 52a is at the outer periphery of the coil and the film is fed from the center of the coil to the film feed out path 16 which starts above the stationary platform 50.

An ideal feed out feed position for the feed out end 52b of the film is shown in solid line near the center of the feed out platform 14 in FIG. 2.

To match the feed out speed with the constant requirement of projector 18, the feed out end of the film is supplied between a pair of feed out arm rollers 54 mounted on a feed out arm 56 pivotally mounted at 58 to stationary platform 50. If the speed of motor 48 is too slow, the feed out end of the film moves to the dot-dash position 52b and is taken from a location which starts to move around the inner periphery of the coil 52. This tends to pull the feed out arm 56 in a clockwise position until it touches a microswitch 60 which is connected to a control mechanism for speeding the rotation of motor 48 and thus rotation of outer platform 42. Momentarily the speed may be a little too great. This forms a loop in the feed out end of the film shown at a dash double dot line 52b. This loop is slowly absorbed as the platter speed slows or is accommodated by the constant speed requirements of the projector.

Throughout the course of the movie, the too slow position and too fast position for the feed out end of the film are created and absorbed over and over again.

Barrier rollers which are labelled B, are positioned in a ring around the stationery platform 50 to act as a barrier against any loops of film which would enter the area of the feed out arm 56.

The feed out end 52b is guided from the inner periphery of coil 52 to the feed out arm rollers 54 and then upwardly, out of the plane of the coil 52 on guide rollers labelled G, to the platter support 11 where the feed out path 16 continues on feed out rollers 62 strategically positioned on the support 11. One of these rollers is replaced by the film feed safety of the present invention which is designated 70 and which will be described later in this disclosure.

Under head wrap conditions, the platter either moves too slowly or stops, or moves too quickly. In either case, the feed end 52b begins to wrap around the barrier rollers B producing a head wrap coil of film which is partially shown at 64. The turns of coil 64 tend to slide over each other until eventually frictional engagement between the turns seize the film and stops it from being fed any further. At the same time, however, the projector 18 and take up platter 26 continue to pull on the film. Damage or film breakage inevitably result.

Figure 4:
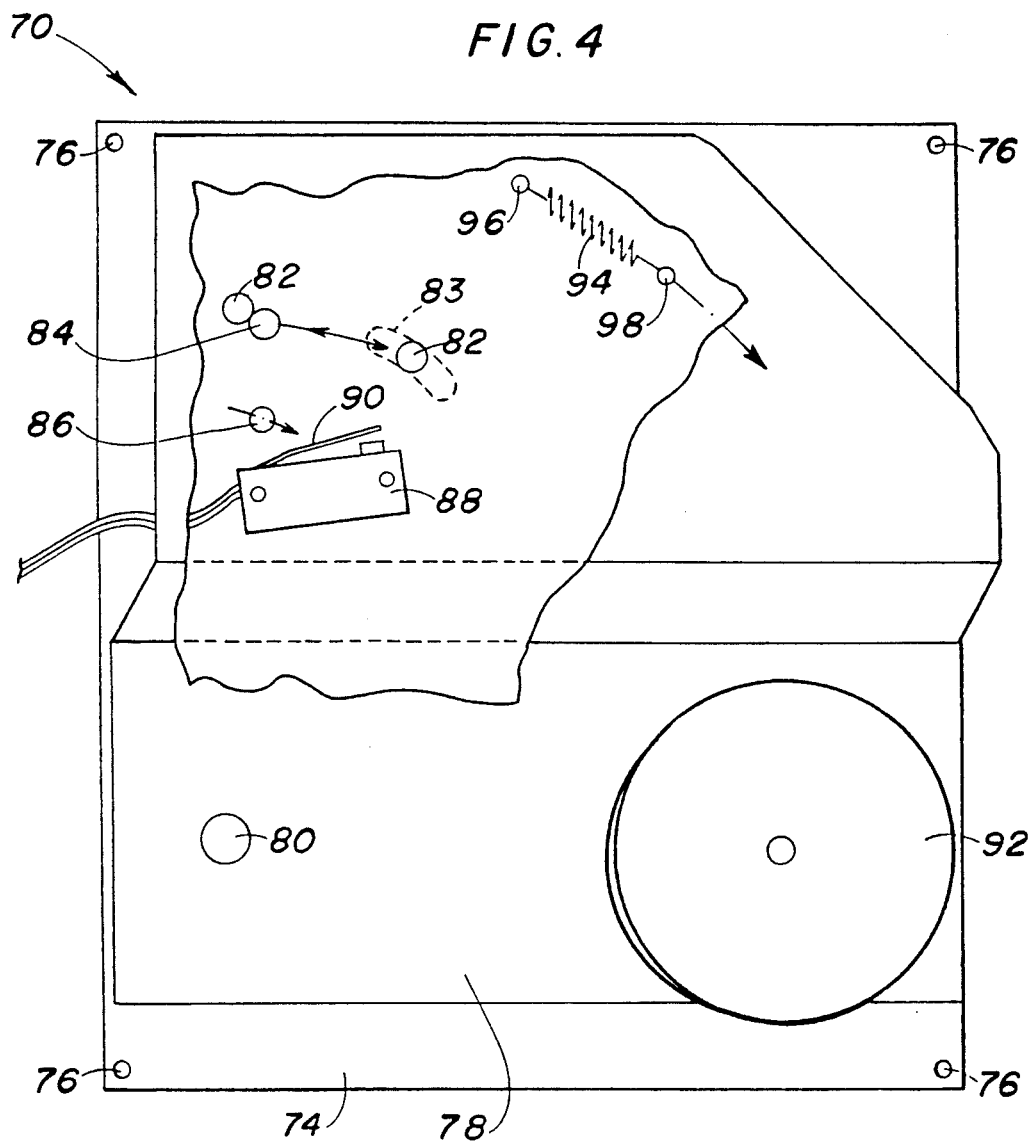
FIG. 4 is a front elevational view with a portion cut away, of a film feed safety device according to the present invention.

Turning now to FIG. 3, the present invention introduces a film feed safety 70 on platter support 11 which carries a film feed safety roller 92 which replaces one, in particular, the upstream most feed out roller 62 on the support post 11 in the feed out path 16. Referring to FIG. 4, the safety device 70 of the present invention comprises a mounting plate 74 which advantageously includes a mounting hole 76 at each of its four corners, for use in attaching plate 74 flat against the surface of vertical platter support 11, using screws, rivets or the like. A roller plate 78 is pivotally mounted to mounting plate 74 at a pivot pin 80. Although the roller plate 78 can be pivotally mounted directly to the support 11, for retrofitting existing platter systems, it is more convenient to supply the device 70 as a unit with a separate mounting plate 74. A pair of stop pins 82 are fixed to and extend forwardly from the mounting plate 74 and stop the clockwise and counterclockwise rotation of roller plate 78 by virtue of a stop pin 84 mounted on the roller plate and extending rearwardly toward the mounting plate and between the stop pins 82. Roller plate 78 also carries a switch activating pin 86 with mounting plate 74 carrying a microswitch 88 having an activating arm 90 that is engaged by the switch pin 86 when roller plate 78 rotates clockwise direction, under the influence of increasing tension on the film path which engages around the roller 92 rotatably mounted on the roller plate 78 at a location spaced from the pivot pin.

The clockwise rotation of roller plate 78 is resisted by a return spring 94 fixed between a spring pin 96 fixed to and extending forwardly from mounting plate 74, and a spring pin 98 fixed to and extending rearwardly from roller plate 78. The strength of spring 94 is selected to provide proper tension of the feed out film on the feed out path 16. Above this proper tension level, which may be caused by the start of a head wrap, the resistance of spring 94 is overcome by the tension on roller 92, closing the microswitch 88.

Figure 5:
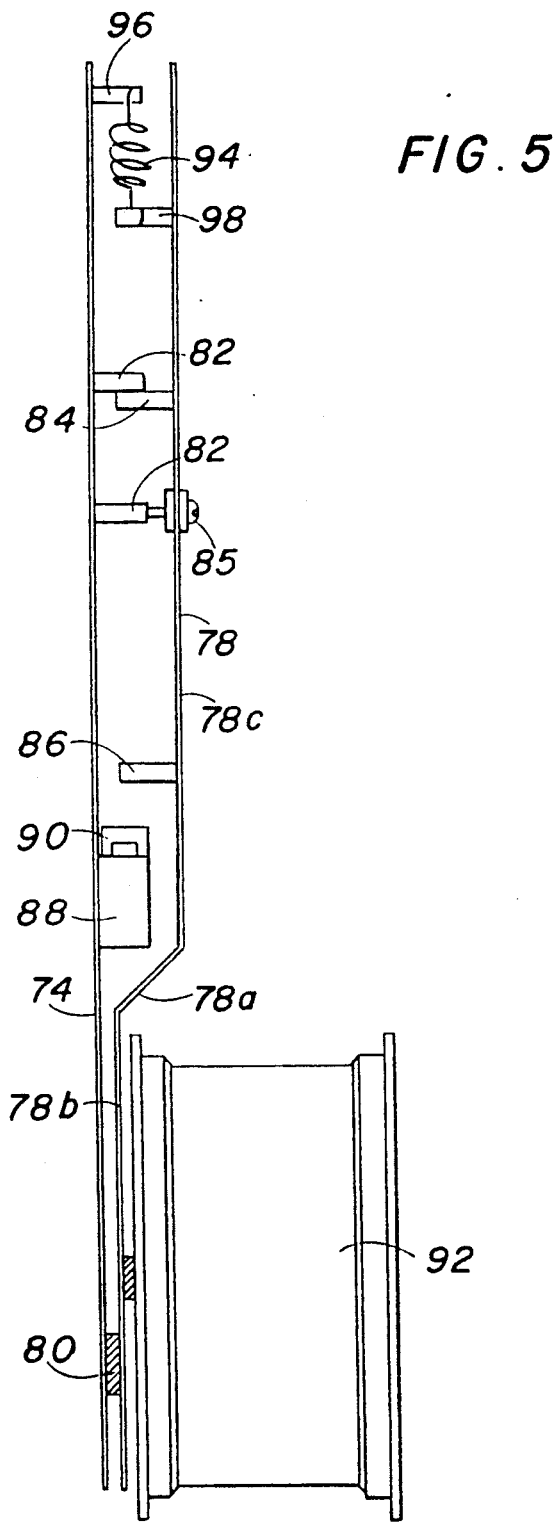
FIG. 5 is a side elevational view of FIG. 4.

To increase the stability of the upper portion of the roller plate 78, roller plate 78 is provided with an arcuate slot 83 whose center is at the pivot point 80. As best shown in FIG. 5, a screw or bolt 85 rides in slot 83 and is threaded into the free end of one of the stop pins 82. Washers are provided on the outer and inner surface of roller plate 78. In this way, the upper end of the roller plate is kept at a fixed spacing from the mounting plate 74. This counteracts any torque or tendency of the roller plate to move away from the mounting plate, due to the pressure of film on the roller 92.

As best shown in FIG. 5, roller plate 78 includes a bend 78a so that a lower part 78b of the roller plate is positioned adjacent and parallel to the mounting plate 74 and an upper part 78c of the roller plate 78 is spaced away from the mounting plate to provide room for the pins, switch and spring. In this way, these parts are kept away from the film path and are covered and protected in the easiest possible manner.

Figure 6:
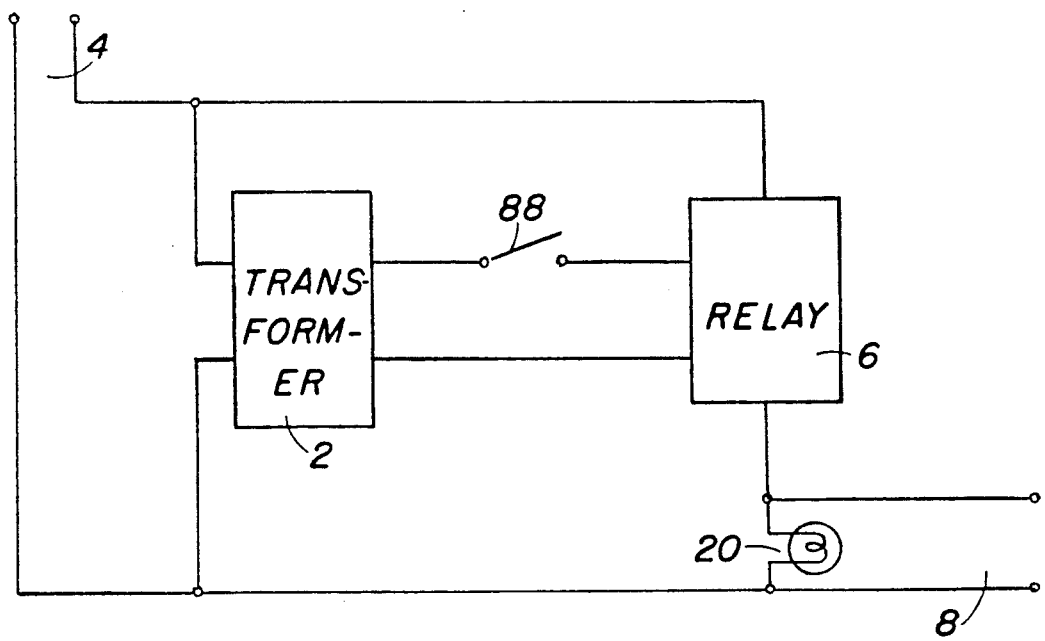
FIG. 6 is a schematic circuit showing the electrical connection of the feed safety device of the present invention.

FIG. 6 shows the electrical part of the safety device of the present invention which comprises a voltage step down transformer 2 which receives 110 volts AC from a power line 4. The power line also provides power over a relay 6 to a line 8 for power to the projector moving mechanism and platter system and to the lamp schematically shown at 20. Switch 88 is positioned between the low voltage side of transformer 2 and the control connection of relay 6, to activate relay 6 when switch 88 is closed, thereby disconnecting AC power to the lamp, projector and platter systems. In this way switch 88 is in a low voltage and current environment to avoid any danger of electrical shock.

Figure 7:
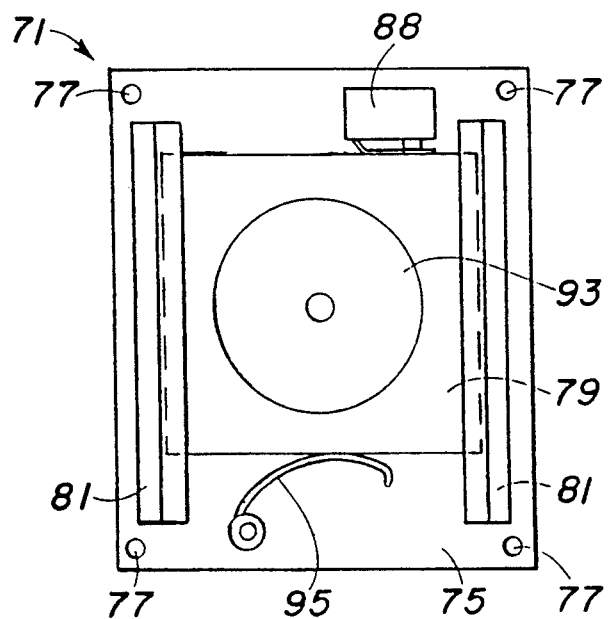
FIG. 7 is a view similar to FIG. 4 of a second embodiment of the invention.

As shown in FIG. 7, an alternate embodiment of the invention has a mechanical portion 71 which utilizes the same switch 88 as the embodiment 70 of FIG. 4 but in a normally closed condition.

The embodiment of device 71 comprises a mounting plate 75 which can be connected for example through holes 77, to the upright support 11 of the platter system. A pair of rails 81, 81 are fixed to and extend vertically, horizontally or at an angle on mounting plate 75 for slidably receiving a roller plate 79 which carries a rotatably mounted film roller 93. A spring in the form of a leaf spring 95 having one end fixed to mounting plate 75 and another end resting against plate 79, urges the plate in a sliding direction toward switch 88 to hold switch 88 closed. Film in the feed out path is wrapped on the roller 93 and, at proper tension, the biasing of spring 95 keeps switch 88 closed. At increasing tension which is indicative of a head wrap beginning, plate 79 slides against the biasing of spring 95 opening switch 88. Conversely, a stop may replace switch 88 and the switch 88 may be positioned on an opposite side of the plate for being in a normally open position until plate 79 moves against the bias of spring 95 to close the switch.

In the foregoing and in the claims, the terms upward, downward and other like terms which are meant to indicate direction, are used as relative terms only and not as absolute indications of direction or orientation.

While a specific embodiment of the invention has been shown and described in detail to illustrate the application of the principles of the invention, it will be understood that the invention may be embodied otherwise without departing from such principles.

What is claimed is:

1. In a film platter system having a feed out platter with means defining a feed out path for film to a projector, a platter support for rotatably carrying the feed out platter, and power supply means for operating the platter system, the platter system being susceptible to a head wrap condition whereupon tension of film on the feed out path increases above a normal tension of the film on the path, the improvement comprising:

a roller plate mounted for movement along the feed out path;

a safety roller mounted for rotation to said roller plate and engaged with film on said feed out path;

biasing means engaged with said roller plate for urging said roller plate in a tension resisting direction and, under normal feeding conditions for film on the feed out path, said biasing means maintaining said roller plate in an inactive position;

switch means engageable by said roller plate and activatable upon movement of said roller plate into an active position spaced from said inactive position and against biasing of said biasing means under elevated tension of film on the feed out path due to a head wrap condition in the platter system;

a mounting plate adapted to be fixed at a selected location along the feed out path, said roller plate being movably mounted to said mounting plate;

said roller plate being pivotally mounted at a pivot point to said mounting plate, said safety roller being rotatably mounted to said mounting plate at a location spaced from said pivot point, said biasing means comprising a spring connected between said mounting plate and said roller plate;

said switch means comprising a microswitch mounted to one of said mounting and roller plates, and an activating pin fixed to the other of said mounting and roller plates for movement to activate said switch in said active position of said roller plate;

said roller plate includes a bend which divides said roller plate between a first part on which said pivot point and safety roller are mounted and which is close to and parallel to said mounting plate, and a second part which is spaced away from said mounting plate, said spring, activating pin and switch being mounted in a spaced between said mounting plate and the second part of said roller plate.

2. The improvement of claim 1, wherein said microswitch is normally closed by engagement of said roller plate against said switch in said inactive position of said roller plate, said microswitch being activated by movement of said roller plate into said active position.

3. The improvement of claim 1, wherein the platter system includes a take up platter rotatably mounted to the platter support, means defining a film take up path to the take up platter, projector means operatively connected to said feed out and take up paths for respectively receiving and discharging film to be projected, said projector means including a safety switch for engagement with film on said take up path and activatable by loss of tension of film on said take up path to stop operation of said platter system and projector means.

4. The improvement of claim 3, wherein said power supply means includes a relay for activation to supply and interrupt power to the platter system, said microswitch being connected to said relay for opening and closing said relay.

5. The improvement of claim 1 wherein, said power supply means includes a relay for activation to supply and interrupt power to the platter system, said switch being connected to said relay for opening and closing said relay.

* * * * *